US012587506B2

(12) United States Patent
Parla

(10) Patent No.:   US 12,587,506 B2
(45) Date of Patent:       Mar. 24, 2026

(54) INTELLIGENT ROUTING AND REDIRECTION TECHNIQUES FOR OPTIMAL SECURE ACCESS TO RESOURCES

(71) Applicant: Cisco Technology, Inc., San Jose, CA (US)

(72) Inventor: Vincent E. Parla, North Hampton, NH (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 18/091,138

(22) Filed: Dec. 29, 2022

(65) Prior Publication Data

US 2024/0073188 A1      Feb. 29, 2024

Related U.S. Application Data

(60) Provisional application No. 63/400,150, filed on Aug. 23, 2022.

(51) Int. Cl.
*H04L 9/40*            (2022.01)
(52) U.S. Cl.
CPC ........ *H04L 63/029* (2013.01); *H04L 63/0272* (2013.01); *H04L 63/0281* (2013.01)
(58) Field of Classification Search
CPC ............... H04L 63/029; H04L 63/0272; H04L 63/0281; H04L 63/0428
USPC ........................................................ 726/15
See application file for complete search history.

(56) References Cited

U.S. PATENT DOCUMENTS

| | | | | |
|---|---|---|---|---|
| 2011/0231655 A1* | 9/2011 | Bollay | .................. | G06F 21/606 |
| | | | | 713/153 |
| 2019/0327312 A1 | 10/2019 | Gupta et al. | | |
| 2020/0145405 A1 | 5/2020 | Bosch et al. | | |
| 2020/0177555 A1 | 6/2020 | Sawant et al. | | |
| 2020/0314212 A1 | 10/2020 | Branch et al. | | |
| 2022/0116326 A1 | 4/2022 | Branch et al. | | |
| 2022/0210130 A1* | 6/2022 | Kaciulis | .................. | H04L 69/14 |
| 2022/0294689 A1* | 9/2022 | Brocato | ............. | H04L 41/0886 |

FOREIGN PATENT DOCUMENTS

| | | | | | |
|---|---|---|---|---|---|
| EP | | 2445147 A1 * | 4/2012 | ............. | H04L 45/04 |
| EP | | 2782316 A1 * | 9/2014 | ........... | G06F 9/5072 |
| WO | WO-2021150422 A1 * | | 7/2021 | ......... | H04L 43/0864 |

* cited by examiner

*Primary Examiner* — Bryan F Wright
(74) *Attorney, Agent, or Firm* — Lee & Hayes, P.C.

(57)             ABSTRACT

Techniques for preserving privacy while still allowing secure access to private resources. Among other things, the techniques may include receiving a request to provide a remote device with access to a private resource. In some instances, the request may be redirected to an identity provider service to authenticate the user of the remote device to maintain anonymity of an identity of the user. The techniques may also include receiving an indication of an entitlement-set provided by the identity provider service, the indication of the entitlement-set indicative of whether the user is entitled to access the resource without revealing the identity of the user. The techniques may also include at least one of authorizing the remote device to access the resource or refraining from authorizing the remote device to access the resource based at least in part on the indication of the entitlement-set.

20 Claims, 8 Drawing Sheets

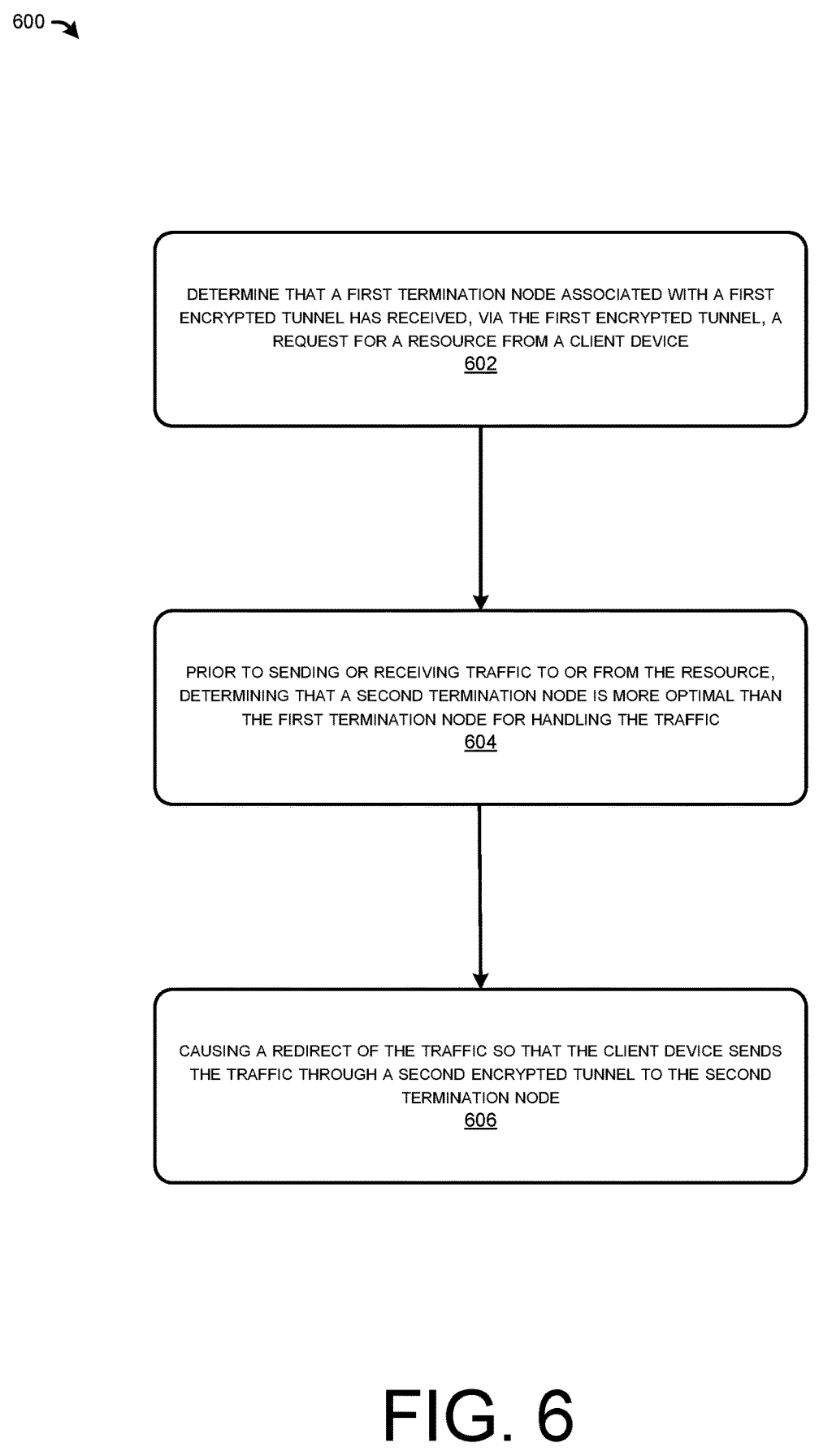

600

DETERMINE THAT A FIRST TERMINATION NODE ASSOCIATED WITH A FIRST ENCRYPTED TUNNEL HAS RECEIVED, VIA THE FIRST ENCRYPTED TUNNEL, A REQUEST FOR A RESOURCE FROM A CLIENT DEVICE
602

PRIOR TO SENDING OR RECEIVING TRAFFIC TO OR FROM THE RESOURCE, DETERMINING THAT A SECOND TERMINATION NODE IS MORE OPTIMAL THAN THE FIRST TERMINATION NODE FOR HANDLING THE TRAFFIC
604

CAUSING A REDIRECT OF THE TRAFFIC SO THAT THE CLIENT DEVICE SENDS THE TRAFFIC THROUGH A SECOND ENCRYPTED TUNNEL TO THE SECOND TERMINATION NODE
606

FIG. 6

INTELLIGENT ROUTING AND REDIRECTION TECHNIQUES FOR OPTIMAL SECURE ACCESS TO RESOURCES

RELATED APPLICATIONS

This application claims priority to U.S. Provisional Application No. 63/400,150, titled "Optimal Resource Routing in VPN, ZTN, Proxy and Relay Systems," and filed on Aug. 23, 2022, the entire contents of which is incorporated herein by reference in its entirety and for all purposes.

TECHNICAL FIELD

The present disclosure relates generally to techniques for, among other things, utilizing intelligent routing and redirection techniques to deliver an optimal secure access experience for a resource over a tunneled or proxied connection.

BACKGROUND

In modern secure access architectures, enterprise resources are commonly served to users via segmented or per-application tunnels or some type of proxy-based system. When a cloud service, private cloud, or enterprise deployment is used to host access capabilities, it is typical to have either a site-to-site backhaul(s) to the resources or to use a relay mechanism, such as that found in MASQUE (Multiplexed Application Substrate over QUIC Encryption) proxy relays. The limitation of these solutions, however, is that optimizations that might be done for the outer traffic (e.g., the tunnel or the proxy encapsulation layer) may not always provide the best outcome for the inner traffic. In other words, while the outer communication protocol might be optimally routed, load balanced, and terminated, the inner, tunneled or encapsulated flow might not.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2 illustrates an example geographic region and process associated with utilizing intelligent routing and redirection techniques to deliver an optimal secure access experience for a client device to access a resource that is located in a different geographic area than an original data center where the client's tunneled flow originally terminated at.

FIG. 6 is a flow diagram illustrating an example method associated with the techniques described herein for utilizing intelligent routing and redirection techniques to deliver an optimal secure access experience for a resource.

DESCRIPTION OF EXAMPLE EMBODIMENTS

Overview

Figure 1:
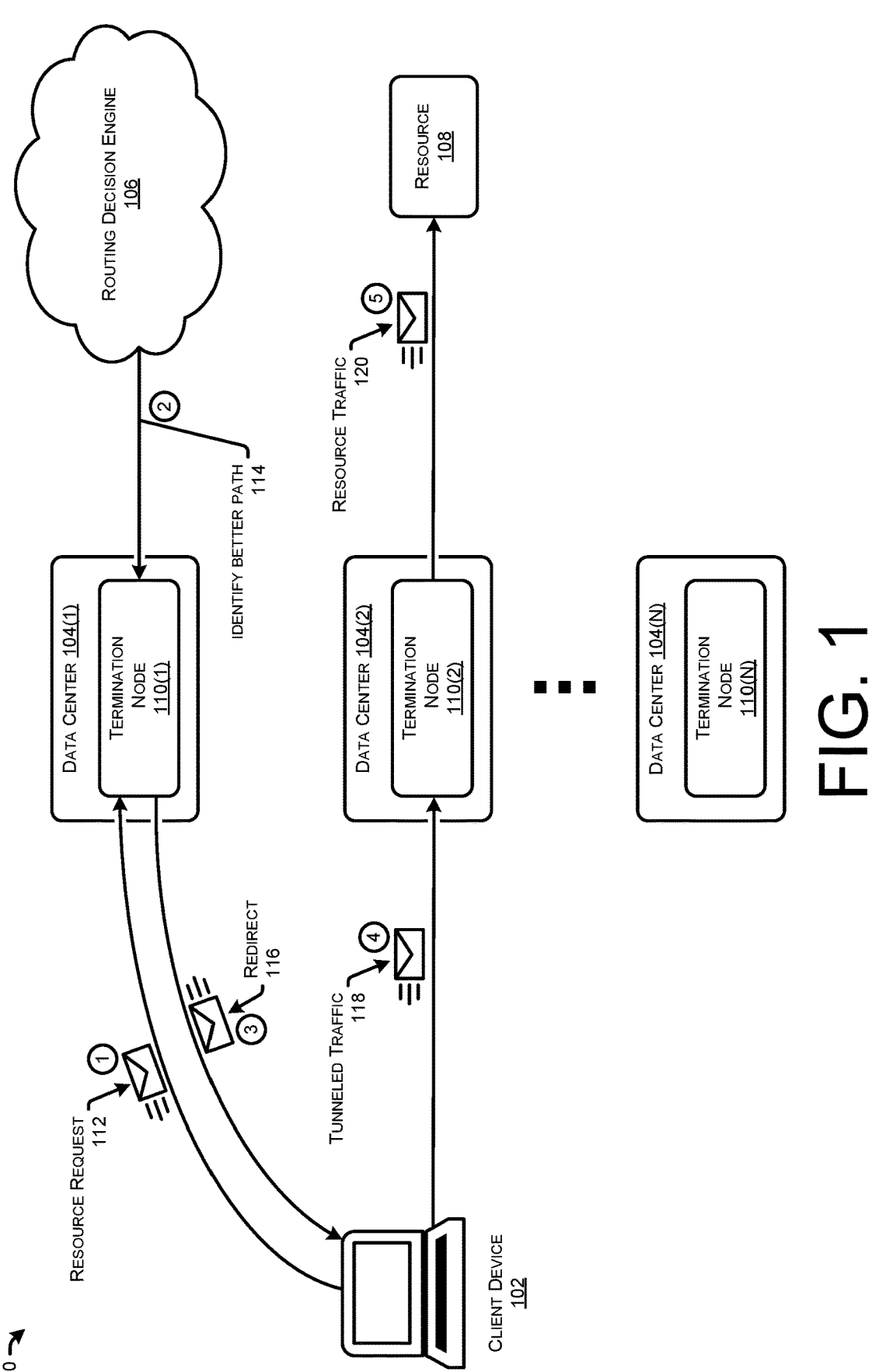
FIG. 1 illustrates an example architecture that may implement various aspects of the technologies described herein for utilizing intelligent routing and redirection techniques to deliver an optimal secure access experience for a resource over a tunneled or proxied connection.

This disclosure describes various technologies for utilizing intelligent routing and redirection techniques to deliver an optimal secure access experience for a resource over a tunneled or proxied connection. By way of example, and not limitation, the techniques described herein may include determining that a first termination node associated with a first encrypted tunnel has received, via the first encrypted tunnel, a request for a resource from a client device. Prior to sending or receiving traffic to or from the resource, the techniques may include determining that a second termination node is more optimal than the first termination node for handling the traffic. Based at least in part on determining that the second termination node is more optimal, a redirect may be issued to cause the client device to send the traffic to the resource through a second encrypted tunnel and the second termination node.

Additionally, the techniques described herein may be performed as a method and/or by a system having non-transitory computer-readable media storing computer-executable instructions that, when executed by one or more processors, performs the techniques described above and herein.

EXAMPLE EMBODIMENTS

As noted above, in modern secure access architectures, enterprise resources are commonly served to users via segmented or per-application tunnels or some type of proxy-based (e.g., or app connector-based) system. When a cloud service, private cloud, or enterprise deployment (e.g., on-premise enterprise deployment) is used to host access capabilities, it is typical to have either a site-to-site backhaul(s) to the resources or to use a relay mechanism, such as that found in MASQUE (Multiplexed Application Substrate over QUIC Encryption) proxy relays. The limitation of these solutions, however, is that optimizations that might be done for the outer traffic (e.g., the tunnel or the proxy encapsulation layer) may not always provide the best outcome for the inner traffic. In other words, while the outer communication protocol might be optimally routed, load balanced, and terminated, the inner, tunneled or encapsulated flow might not.

For example, using anycast, a secure access solution might route a VPN (Virtual Private Network) or Proxy connection to a termination node (e.g., proxy, app connector, etc.) that is closest to the user. However, the resource being accessed by the user might be optimally delivered from a different data center than the one that the user's VPN or Proxy tunnel is terminated at. In many cases, an optimal path might be one that is not optimal to either flow independently, but a combination of both elements such that migrating the session to another termination node might provide for the best user experience for the resource being accessed.

This application is directed to techniques for utilizing intelligent routing and redirection techniques to deliver an optimal secure access experience for a resource over a tunneled or proxied connection that takes into account optimizations for, both, the outer communication protocol traffic, as well as the inner, tunneled or encapsulated flow. For example, anycast routing may initially land a client (e.g., VPN client, ZTNA (zero trust network access) client, etc.) request on a nearest datacenter for proxy termination. In some examples, a backend intelligent routing decision engine may then determine that there is a better path via a different datacenter for the specific application the client is requesting. In some examples, a redirect (e.g., permanent redirect or temporary redirect) may then be sent to the client to redirect the client traffic to the different data center. In some instances, the client may cache the mapping indefinitely when a permanent redirect is received, or cache the mapping temporarily (e.g., based on a time to live) when a temporary redirect is received. In some examples, the intelligent routing and decision engine may determine that the client is to send its traffic to a relay node in a first datacenter, and then the traffic is to be forwarded to a proxy node in a different datacenter, and then forwarded on to the requested service/application. In some examples, the intelligent routing and decision engine may determine a best data center for policy application for an encapsulated portion of traffic such that the inner traffic is optimally served. For example, the techniques disclosed may ensure that a user's tunneled traffic is not terminated in Seattle (e.g., at a VPN termination point), and then the inner traffic is not forwarded on to the destination service/application in Chicago, for example. In various examples, the techniques of this disclosure are equally applicable to different deployment scenarios used for secure access. For example, the techniques of this disclosure can be applied to cloud hosted solutions, on-premise solutions, hybrid solutions, and/or the like.

By way of example, and not limitation, a method according to the technologies described herein may include determining that a first termination node (e.g., VPN terminator, ZTN terminator, proxy, app connector, etc.) associated with a first encrypted tunnel has received, via the first encrypted tunnel, a request for a resource from a client device. In some examples, the first termination node may be located in a first datacenter that is disposed in a first geographic location. In some examples, the first encrypted tunnel connection may be a virtual private network (VPN) connection, a zero-trust network (ZTN) connection, a proxy connection, a proxy and relay connection, and/or the like. For instance, the first termination node may be a first proxy node. Additionally, in such instances, the first encrypted tunnel may include one or more relay node(s) disposed between the client device and the first proxy node. In some examples, each different relay node and/or the proxy node may apply a different policy to the traffic as it is traversing the first encrypted tunnel.

In some examples, the determination that the first termination node received the request/traffic may be made by a routing decision engine. In some examples, the routing decision engine may have visibility of the first termination node and other termination nodes in the first data center and other data centers. For instance, the routing decision engine may be able to see which termination nodes are over-utilized, under-utilized, experiencing delays or failures, and/or the like. Additionally, in some examples, the routing decision engine may have functionality to determine which termination nodes would result in optimal paths for routing traffic to different resources. For example, the routing decision engine may have the capability to determine that a tunneled flow should be terminated at a termination node that is closer to a target resource, even if the termination node is farther away from the client device than another termination node.

In some examples, prior to any traffic being sent to or from the resource (e.g., by the first, or original, termination node), or after traffic has already been sent to or from the resource, the method may include determining that a second termination node is more optimal than the first termination node for handling the traffic. For instance, the routing decision engine may determine that the second termination node is more optimal than the first termination node. As an example, the routing decision engine may determine that the second termination node is located in a same data center as the resource to be accessed or located in closer proximity to the resource in general than the first termination node. Additionally, or alternatively, the routing decision engine may determine that the second termination node is under-utilized and/or less constrained for resources than the first termination node (e.g., able to provide a better connection with greater bandwidth, less latency, less jitter, less packet loss, etc. than the first termination node). In some examples, the second termination node may be a second proxy node and the second encrypted tunnel may include one or more relay node(s) (e.g., similar to the first encrypted tunnel) disposed between the client device and the second proxy node.

In some examples, based at least in part on determining that the second termination node is more optimal, the routing decision engine may cause a redirect of the traffic so that the client device sends the traffic to the resource through a second encrypted tunnel and the second termination node. In some examples, the second encrypted tunnel connection may be a VPN connection, a ZTNA connection, a proxy connection, a proxy and relay connection, and/or the like. In some examples, the routing decision engine may cause the second encrypted tunnel to be established between the client device and the second termination node prior to causing the redirect of the traffic. Alternatively, the second encrypted tunnel may already be established and the routing decision engine simply redirects the flow through the second tunnel.

In some examples, the routing decision engine may cause permanent redirects and/or temporary redirects. In the case of a permanent redirect, the client device may store a mapping indicating that traffic associated with the resource is to be sent through the second encrypted tunnel. In the case of a temporary redirect, the temporary redirect may include a time-to-live for the client device to send the traffic over the second encrypted tunnel (e.g., before sending the traffic back through the first encrypted tunnel, a different tunnel, or re-evaluation of the second encrypted tunnel).

In some examples, different combinations of routing, such as cross data center routing may be possible depending on what the routing decision engine identifies as the most optimal path for a flow. For instance, a flow may initially begin in which an original (e.g., first) relay node and an original proxy node are associated with a same, first data-center, but then be redirected to flow through a new relay node and a new proxy node that are each associated with a same, second datacenter. In such examples, the first data-center and the second datacenter may be disposed in different geographic locations. As another example, a flow may initially begin in which the original relay node and the original proxy node are associated with the same, first datacenter, but then be redirected to flow through a new relay node and a new proxy node that are each associated with different datacenters (e.g., a second data center and a third data center). As yet another example, the flow may initially begin in which the original relay node and the original proxy node are associated with the same, first datacenter, but then be redirected to flow through the original relay node and a new proxy node that are each associated with different datacenters (e.g., the first data center and a second data center).

According to the technologies disclosed herein, several advantages in computer-related technology can be realized. For example, by utilizing the intelligent routing and redirect techniques of this disclosure, secured access flows can be better served for a best user experience for a resource being accessed. That is, the technologies provided for herein allow for establishment and/or redirection of flows so that an optimal path can be determined, which might be a path that is not necessarily optimal to either encrypted or unencrypted flows independently, but a combination of both elements such that migrating the session to another termination node might provide for the best user experience for the resource being accessed. These techniques can increase bandwidth for secure access flows, reduce latency for secure access flows, and much more (e.g., reduce jitter, reduce packet loss), thereby improving the functioning of computing devices in the context of termination nodes (e.g., VPN termination nodes, ZTNA terminations nodes, proxy nodes, etc.). Other advantages will be readily apparent to those having ordinary skill in the art.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example architecture 100 that may implement various aspects of the technologies described herein for utilizing intelligent routing and redirection techniques to deliver an optimal secure access experience for a resource over a tunneled or proxied connection. The architecture 100 includes a client device 102, one or more data center(s) 104(1)-104(N) (where "N" represents any number greater than or equal to 1), a routing decision engine 106, and a resource 108. Additionally, each of the data center(s) 104(1), 104(2), and 104(N) (hereinafter referred to collectively as "data centers 104") may include one or more termination node(s) 110(1)-110(N) (hereinafter referred to collectively as "termination nodes 110"). In some examples, a single data center, such as the data center 104(1), may include multiple termination nodes 110.

In some examples, the client device 102 may be any user device that is capable of communicating over a network. For instance, the client device 102 may be a desktop computer, laptop or personal computer, cell phone, tablet, smart television, router, switch, or any other electronic device capable of sending data packets and establishing network flows. In some examples, the client device 102 may be running a tunneling client, such as a VPN client, a ZTNA client, a proxy client, or the like.

In some examples, the data centers 104 may include computing devices that are housed therein. That is, the one or more data centers 104 may be physical facilities or buildings located across different geographic areas that are designated to store networked devices that are part of a networked computing environment, such as the architecture 100. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure and/or enterprise on-premise resources specifically designed for enterprise needs, and/or for cloud-based service provider needs. Generally, the data centers 104 (physical and/or virtual) may provide basic resources such as processor (CPU), memory (RAM), storage (disk), secure access, remote access, and networking (bandwidth).

In some examples, the routing decision engine 106 may have visibility of the network traffic going through the data centers 104. For instance, the routing decision engine 106 may be able to see which termination nodes 110 are over-utilized, under-utilized, experiencing delays or failures, and/or the like. Additionally, in some examples, the routing decision engine 110 may have functionality to determine which termination nodes 110 would result in optimal paths for routing traffic to different resources, such as the resource 108. For example, the routing decision engine 106 may have the capability to determine that a tunneled flow should be terminated at a termination node that is closer to a target resource, even if the termination node is farther away from the client device than another termination node. In some examples, the routing decision engine 106 may be a cloud-delivered entity that is topographically running in each of the data centers 104, a standalone entity with visibility into the data centers 104, an on-premise enterprise entity, and/or the like. In some examples, the routing decision engine 106 may be hosted on the various computing resources housed in the data centers 104 in a distributed offering.

In some examples, the resource 108 may be any network resource accessible to the client device 102 over a network. For instance, the resource 108 may be a web-based application, a webpage, an enterprise resource, or the like. In some examples, the resource 108 may be a public resource or a private resource (e.g., a private, enterprise resource). In various examples, the resource 108 is an enterprise private resource that needs to be accessed over a secure, tunneled connection, such as a relay and proxy connection, a VPN connection, a zero trust connection, or the like.

In some examples, the termination nodes 110 may be tunnel termination nodes, such as VPN termination nodes (e.g., VPN concentrator), ZTNA termination nodes, proxy nodes, or the like. In some examples, each data center 104 may include one or multiple termination nodes 110, even though the data centers 104 are each shown as only having one respective termination node 110 in FIG. 1.

FIG. 1 also illustrates an example workflow associated with the technologies described herein for utilizing intelligent routing and redirection techniques to deliver an optimal secure access experience for a resource over a tunneled or proxied connection. For example, at "1," a resource request 112 is sent from the client device 102. The resource request 112 may be associated with the client device 102 requesting to be connected to the resource 108. For instance, the resource request 112 may be a URL, hostname, DNS name, etc. that the client device includes in traffic to be connected to the resource 108.

Because the routing decision engine 106 has visibility of the data centers 104 and the flows traversing them, the routing decision engine can determine that the resource request 112 has been received by the termination node 110(1) of the data center 104(1). As such, at "2," the routing decision engine 106 may identify a better path 114 for sending the traffic to the resource 108. For instance, the routing decision engine 106 may have functionality to determine which termination nodes 110 and/or data centers 104 would provide the most optimal paths for routing traffic to different resources. For example, in the specific scenario shown in FIG. 1, the routing decision engine 106 determines that the data center 104(2) and the termination node 110(2) would be a best, optimal path for servicing both the tunneled traffic 118 (e.g., the encrypted tunnel traffic) and the resource traffic 120 (e.g., the unencrypted, post-tunnel traffic). As illustrated in FIG. 1, in some examples, this identification of the most optimal routing path may be made prior to any traffic (e.g., resource traffic 120) being sent to or from the resource 108 (e.g., by the termination node 110(1)).

In some examples, the identification of the better path may be made by the routing decision engine 106 based at least in part on one or more traffic constraint factors, such as a determination that the termination node 110(2) is under-utilized and/or less constrained for resources than the termination node 110(1) (e.g., able to provide a better connection with greater bandwidth, less latency, less jitter, less packet loss, etc. than the first termination node), a determination that the termination node 110(2) and/or data center 104(2) is in closer networking proximity to the resource 108 than the termination nodes 110(1) and/or 110(N), the data centers 104(1) and/or 104(N), or the like. In some examples, the routing decision engine 106 may determine that the termination node 110(2) and the data center 104(2) would provide a networking path that would not necessarily be the best path for the tunneled traffic 118 or the resource traffic 120 individually, but that in combination the termination node 110(2) and the data center 104(2) would provide a "best" networking path for both stages of the traffic (e.g., the tunneled traffic and the inner traffic).

At "3," based at least in part on determining that the termination node 110(2) is more optimal, the routing decision engine 106 may cause a redirect 116 of the traffic so that the client device 102 sends the traffic to the resource 108 through the termination node 110(2) and the data center 104(2). At "4," based on the redirect, which may be permanent or temporary, the client device 102 may send tunneled traffic 118 to the termination node 110(2), and at "5," the termination node 110(2) may decapsulate the tunneled traffic 118 and forward the inner, resource traffic 120 to the resource 108.

In some examples, an encrypted tunnel connection may be established between the client device 102 and the termination node 110(2)/data center 104(2) for sending the tunneled traffic 118. The encrypted tunnel connection may, in some examples, be a VPN connection, a ZTNA connection, a proxy connection, a proxy and relay connection, and/or the like. In some examples, the routing decision engine 106 may cause the encrypted tunnel to be established between the client device 102 and the termination node 110(2) prior to causing the redirect of the traffic. Alternatively, the encrypted tunnel may already be established and the routing decision engine 106 may simply redirect the flow through the second tunnel.

Figure 2:
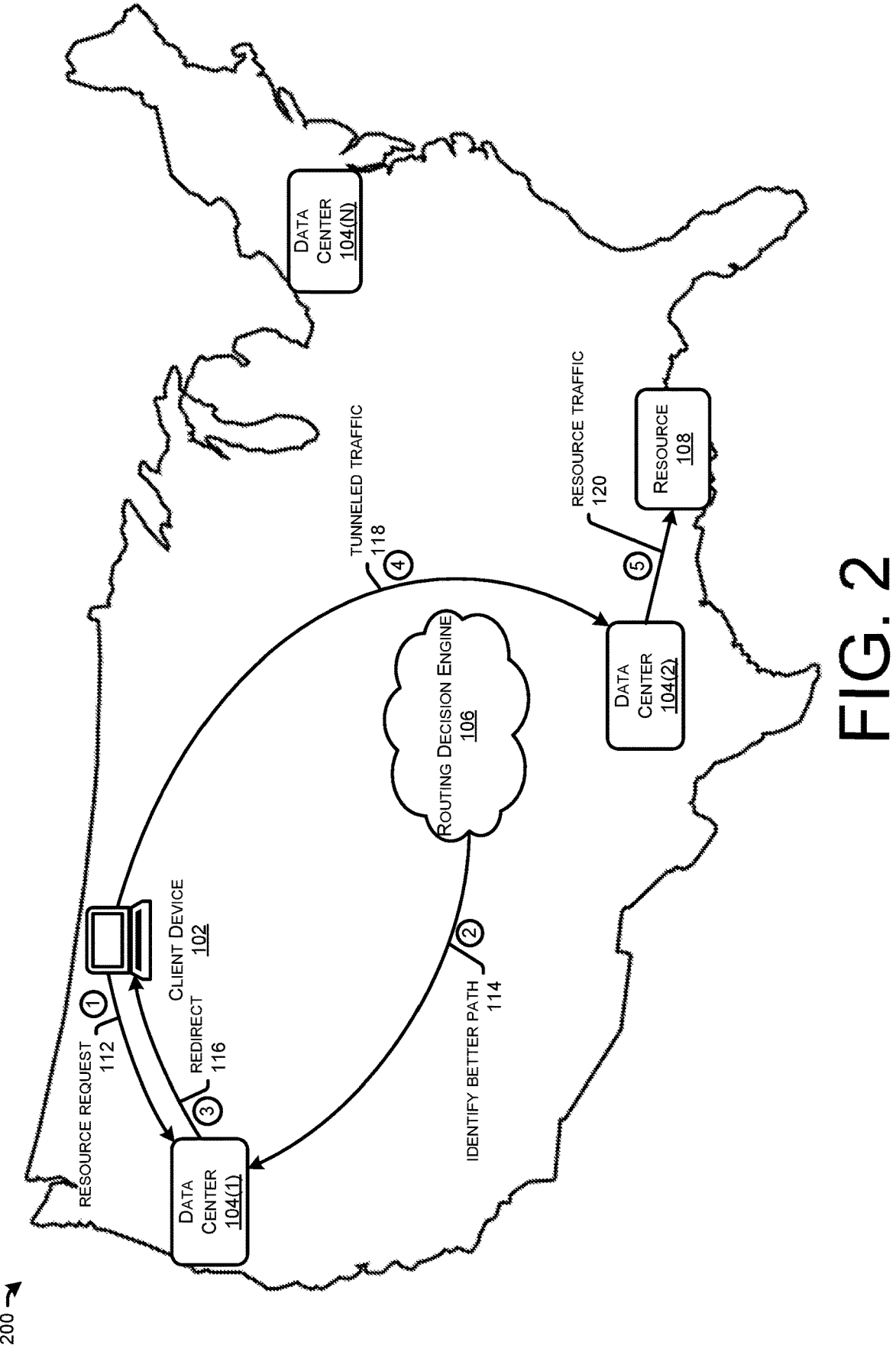

FIG. 2 illustrates an example geographic region 200 and process associated with utilizing intelligent routing and redirection techniques to deliver an optimal secure access experience for a client device to access a resource that is located in a different geographic area than an original data center where the client's tunneled flow originally terminated at. For example, at "1," a resource request 112 is sent from the client device 102, which may be located in Bozeman, Montana. Although the resource 108 being requested may be located in New Orleans, anycast routing may initially land the resource request 112 on a termination node in a nearest data center 104(1) for proxy termination, and this data center 104(1) may be located in Portland. In some examples, the resource request 112 may be associated with the client device 102 requesting to be connected to the resource 108. For instance, the resource request 112 may be a URL, hostname, DNS name, etc. that the client device includes in traffic to be connected to the resource 108.

Because the routing decision engine 106 has visibility of the data centers 104 and the flows traversing them, the routing decision engine can determine that the resource request 112 has been received at the data center 104(1). As such, at "2," the routing decision engine 106 may identify a better path 114 for sending the traffic to the resource 108. For instance, the routing decision engine 106 may have functionality to determine which data centers 104 would provide the most optimal paths for routing traffic to different resources. For example, in the specific scenario shown in FIG. 2, the routing decision engine 106 determines that the data center 104(2), located in Austin, would be a best, optimal path for servicing both the tunneled traffic 118 (e.g., the encrypted tunnel traffic) and the resource traffic 120 (e.g., the unencrypted, post-tunnel traffic).

In some examples, the identification of the best path may be made by the routing decision engine 106 based at least in part on one or more traffic constraint factors, such as a determination that a termination node (e.g., proxy) in the data center 104(2) is under-utilized and/or less constrained for resources than the termination node in the data center 104(1) (e.g., able to provide a better connection with greater bandwidth, less latency, less jitter, less packet loss, etc. than the first termination node), a determination that the data center 104(2) is in closer networking proximity to the resource 108 than the data centers 104(1) and/or 104(N), or the like. In some examples, the routing decision engine 106 may determine that the data center 104(2) would provide a networking path that would not necessarily be the best path for the tunneled traffic 118 or the resource traffic 120 individually, but that in combination the data center 104(2) would provide a "best" networking path for both stages of the traffic (e.g., the tunneled traffic and the inner traffic).

At "3," the routing decision engine 106 may cause a redirect 116 of the traffic so that the client device 102 sends the traffic to the resource 108 through the data center 104(2). At "4," based on the redirect, which may be permanent or temporary, the client device 102 may send tunneled traffic 118 to the data center 104(2), and at "5," the data center 104(2) (or a proxy in that data center) may decapsulate the tunneled traffic 118 and forward the inner, resource traffic 120 to the resource 108.

In some examples, an encrypted tunnel connection may be established between the client device 102 and the data center 104(2) for sending the tunneled traffic 118. The encrypted tunnel connection may, in some examples, be a VPN connection, a ZTNA connection, a proxy connection, a proxy and relay connection, and/or the like. In some examples, the routing decision engine 106 may cause the encrypted tunnel to be established between the client device 102 and the data center 104(2) prior to causing the redirect of the traffic. Alternatively, the encrypted tunnel may already be established and the routing decision engine 106 may simply redirect the flow through the second tunnel.

Figure 3:
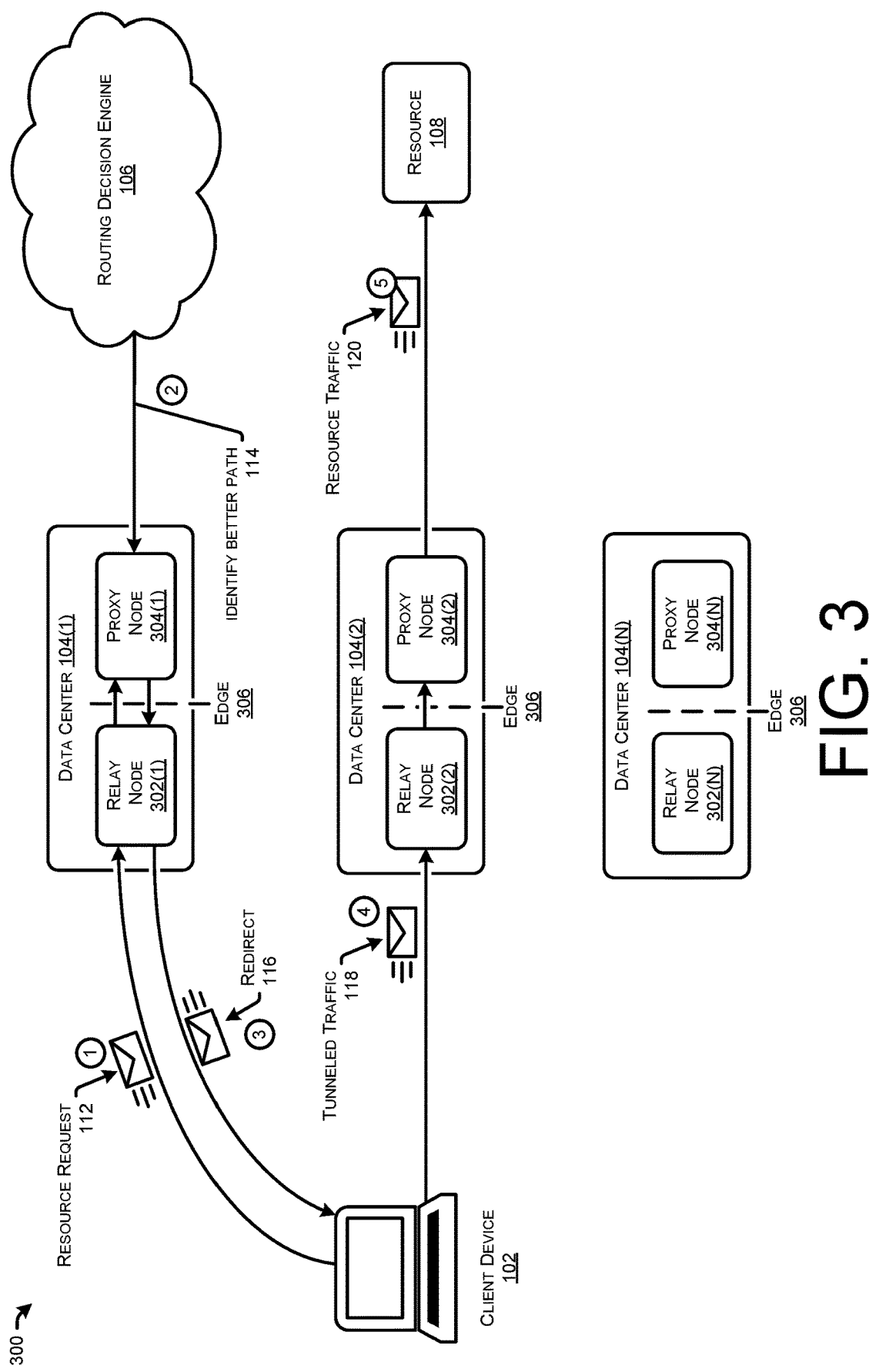
FIGS. 3-5 illustrate different, optimal networking path topologies that may be utilized to deliver an optimal secure access experience for a client device to access a resource.
Figure 4:
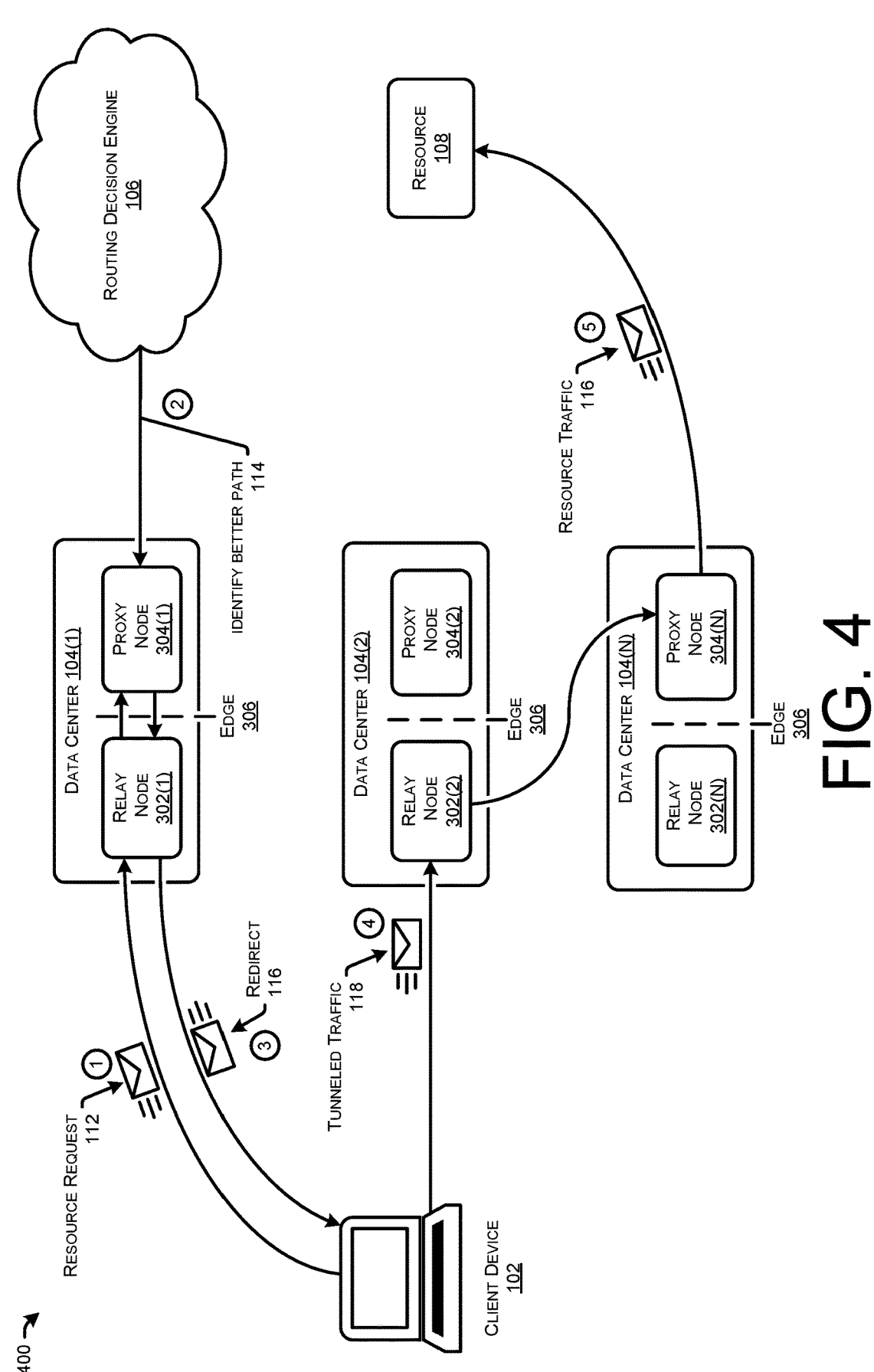
Figure 5:
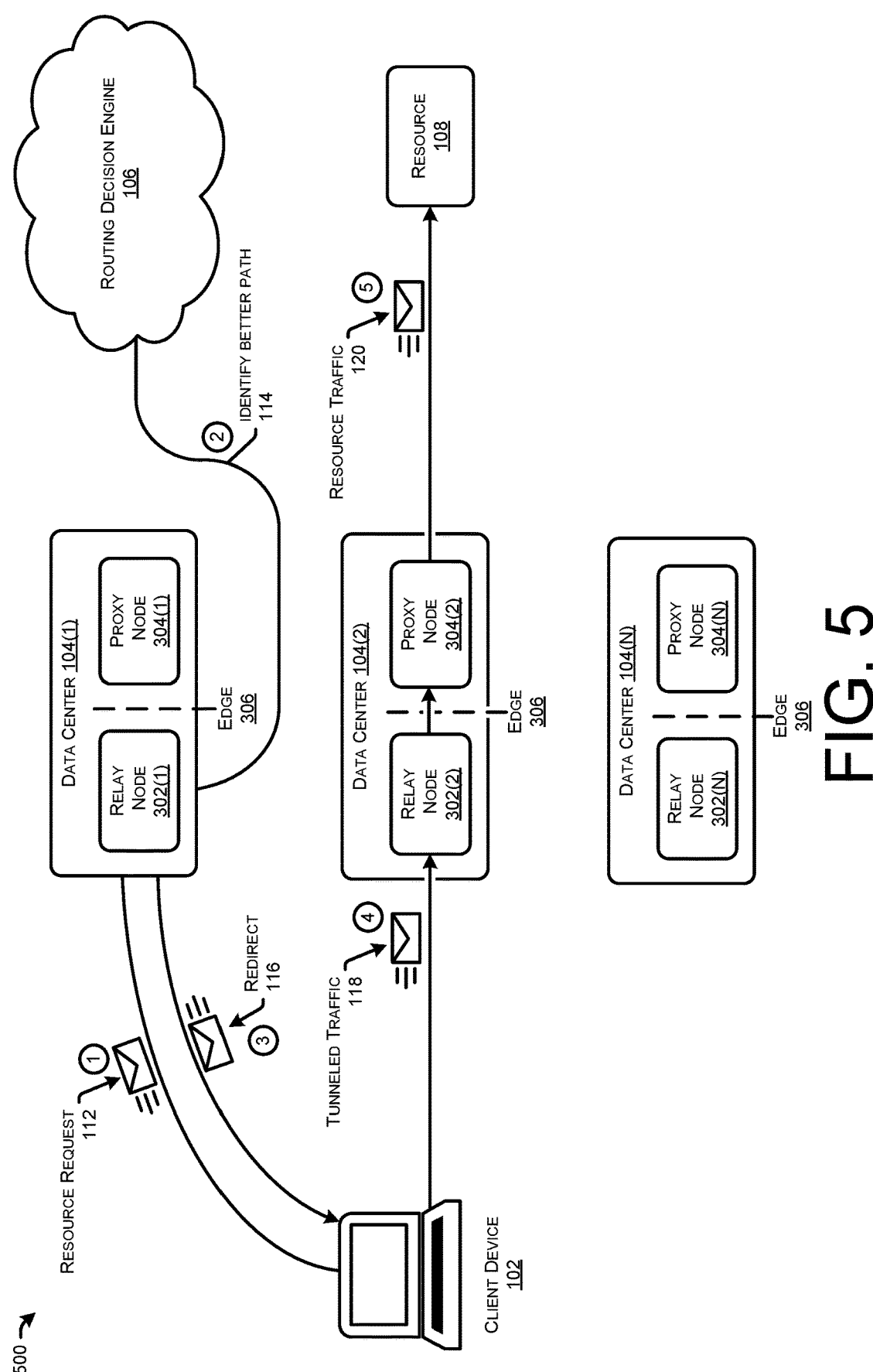

FIGS. 3-5 illustrate different, optimal networking path topologies 300, 400, and 500 that may be utilized to deliver an optimal secure access experience for a client device to access a resource. In the examples shown in FIGS. 3-5, the data centers 104 include relay nodes 302(1)-302(N) and proxy nodes 304(1)-304(N). In examples, the relay nodes 302 may be disposed such that they reside on a cloud-side of a network edge 306, and the proxy nodes 304 may be disposed such that they reside on an enterprise-side (e.g., on-prem) of the edge 306. In some examples, the proxy nodes 304 may be located on an enterprise edge network or a cloud edge network, and the relay nodes 302 may reside in the cloud. Although the relay nodes 302 and proxy nodes 304 are illustrated as being in same data centers 104, it is to be appreciated that the relay nodes 302 and proxy nodes 304 could be in different data centers. Additionally, any routing path could have multiple relay nodes between the client device 102 and the proxy nodes 304.

With respect to FIG. 3, at "1," a resource request 112 is sent from the client device 102, and anycast routing or another routing algorithm may initially route the resource request 112 such that it traverses the relay node 302(1) and lands on the proxy node 304(1) in the data center 104(1). In some examples, the resource request 112 may be associated with the client device 102 requesting to be connected to the resource 108. For instance, the resource request 112 may be a URL, hostname, DNS name, etc. that the client device includes in traffic to be connected to the resource 108.

Because the routing decision engine 106 has visibility of the data centers 104 and the flows traversing them, the routing decision engine can determine that the resource request 112 has been received at the data center 104(1). As such, at "2," the routing decision engine 106 may identify a better path 114 for sending the traffic to the resource 108. For instance, the routing decision engine 106 may have functionality to determine which data centers 104 would provide the most optimal paths for routing traffic to different resources. For example, in the specific scenario shown in FIG. 3, the routing decision engine 106 determines that the most optimal path for servicing both the tunneled traffic 118 (e.g., the encrypted tunnel traffic) and the resource traffic 120 (e.g., the unencrypted, post-tunnel traffic) is through the relay node 302(2) and the proxy node 304(2) of the data center 104(2).

In some examples, the identification of the best path may be made by the routing decision engine 106 based at least in part on one or more traffic constraint factors, such as a determination that the relay node 302(2) and/or the proxy node 304(2) is/are under-utilized and/or less constrained for resources than the other relay and/or proxy nodes (e.g., able to provide a better connection with greater bandwidth, less latency, less jitter, less packet loss, etc. than the first proxy node), a determination that the data center 104(2) is in closer networking proximity to the resource 108 than the data centers 104(1) and/or 104(N), or the like. In some examples, the routing decision engine 106 may determine that the relay node 302(2) and the proxy node 304(2) would provide a networking path that would not necessarily be the best path for the tunneled traffic 118 or the resource traffic 120 individually, but that in combination the relay node 302(2) and the proxy node 304(2) would provide a "best" networking path for both stages of the traffic (e.g., the tunneled traffic and the inner traffic).

At "3," the routing decision engine 106 may cause a redirect 116 of the traffic so that the client device 102 sends the traffic to the resource 108 through the relay node 302(2) and the proxy node 304(2) of the data center 104(2). At "4," based on the redirect, which may be permanent or temporary, the client device 102 may send tunneled traffic 118 to the relay node 302(2), which is then processed and forwarded to the proxy node 304(2), and at "5," the proxy node 304(2) may decapsulate the tunneled traffic 118 and forward the inner, resource traffic 120 to the resource 108.

With respect to FIG. 4, at "1," a resource request 112 is sent from the client device 102, and any cast routing or another routing algorithm may initially route the resource request 112 such that it traverses the relay node 302(1) and lands on the proxy node 304(1) in the data center 104(1). In some examples, the resource request 112 may be associated with the client device 102 requesting to be connected to the resource 108. For instance, the resource request 112 may be a URL, hostname, DNS name, etc. that the client device includes in traffic to be connected to the resource 108.

Because the routing decision engine 106 has visibility of the data centers 104 and the flows traversing them, the routing decision engine can determine that the resource request 112 has been received at the data center 104(1). As such, at "2," the routing decision engine 106 may identify a better path 114 for sending the traffic to the resource 108. For instance, the routing decision engine 106 may have functionality to determine which data centers 104 would provide the most optimal paths for routing traffic to different resources. For example, in the specific scenario shown in FIG. 4, the routing decision engine 106 determines that the most optimal path for servicing both the tunneled traffic 118 (e.g., the encrypted tunnel traffic) and the resource traffic 120 (e.g., the unencrypted, post-tunnel traffic) is through the relay node 302(2) of the data center 104(2) and the proxy node 304(N) of the data center 104(N).

In some examples, the identification of the best path may be made by the routing decision engine 106 based at least in part on one or more traffic constraint factors, such as a determination that the relay node 302(2) and/or the proxy node 304(N) is/are under-utilized and/or less constrained for resources than the other relay and/or proxy nodes (e.g., able to provide a better connection with greater bandwidth, less latency, less jitter, less packet loss, etc. than the first proxy node), a determination that the proxy node 304(2) is down and that the proxy node 304(N) is a next closest proxy node to the resource 108, or the like. In some examples, the routing decision engine 106 may determine that the relay node 302(2) and the proxy node 304(N) would provide a networking path that would not necessarily be the best path for the tunneled traffic 118 or the resource traffic 120 individually, but that in combination the relay node 302(2) and the proxy node 304(N) would provide a "best" networking path for both stages of the traffic (e.g., the tunneled traffic and the inner traffic).

At "3," the routing decision engine 106 may cause a redirect 116 of the traffic so that the client device 102 sends the traffic to the resource 108 through the relay node 302(2) and the proxy node 304(N). At "4," based on the redirect, which may be permanent or temporary, the client device 102 may send tunneled traffic 118 to the relay node 302(2), which is then processed and forwarded to the proxy node 304(N), and at "5," the proxy node 304(N) may decapsulate the tunneled traffic 118 and forward the inner, resource traffic 120 to the resource 108.

Turning to FIG. 5, at "1," a resource request 112 is sent from the client device 102, and anycast routing or another routing algorithm may initially route the resource request 112 such that it is sent to the data center 104(1). At the data center 104(1), the resource request 112 may land on the relay node 302(1). Because the routing decision engine 106 has visibility of the data centers 104 and the flows traversing them, the routing decision engine can determine that the resource request 112 has been received at the relay node 302(1) before the relay node 302(1) ever forwards the request to the proxy node 304(1). As such, at "2," the routing decision engine 106 may identify a better path 114 for sending the traffic to the resource 108. For instance, the routing decision engine 106 may have functionality to determine which data centers 104 would provide the most optimal paths for routing traffic to different resources. For example, in the specific scenario shown in FIG. 5, the routing decision engine 106 determines that the most optimal path for servicing both the tunneled traffic 118 (e.g., the encrypted tunnel traffic) and the resource traffic 120 (e.g., the unencrypted, post-tunnel traffic) is through the relay node 302(2) and the proxy node 304(2) of the data center 104(2).

In some examples, the identification of the best path may be made by the routing decision engine 106 based at least in part on one or more traffic constraint factors, such as a determination that the relay node 302(2) and/or the proxy node 304(2) is/are under-utilized and/or less constrained for resources than the other relay and/or proxy nodes (e.g., able to provide a better connection with greater bandwidth, less latency, less jitter, less packet loss, etc. than the first proxy node), a determination that the proxy node 304(1) is down and that the proxy node 304(2) is a next closest proxy node to the resource 108, a determination that the relay node 302(1) is having trouble sending out-bound packets, or the like. In some examples, the routing decision engine 106 may determine that the relay node 302(2) and the proxy node 304(2) would provide a networking path that would not necessarily be the best path for the tunneled traffic 118 or the resource traffic 120 individually, but that in combination the relay node 302(2) and the proxy node 304(2) would provide a "best" networking path for both stages of the traffic (e.g., the tunneled traffic and the inner traffic).

At "3," the routing decision engine 106 may cause a redirect 116 of the traffic so that the client device 102 sends the traffic to the resource 108 through the relay node 302(2) and the proxy node 304(2). At "4," based on the redirect, which may be permanent or temporary, the client device 102 may send tunneled traffic 118 to the relay node 302(2), which is then processed and forwarded to the proxy node 304(2), and at "5," the proxy node 304(2) may decapsulate the tunneled traffic 118 and forward the inner, resource traffic 120 to the resource 108.

FIG. 6 is a flow diagram illustrating an example method 600 associated with the techniques described herein for utilizing intelligent routing and redirection techniques to deliver an optimal secure access experience for a resource. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

The method 600 begins at operation 602, which includes determining that a first termination node associated with a first encrypted tunnel has received, via the first encrypted tunnel, a request for a resource from a client device. For instance, the routing decision engine 106 may determine that the termination node 110(1) received the resource request 112 from the client device 102.

At operation 604, the method 600 includes prior to sending or receiving traffic to or from the resource, determining that a second termination node is more optimal than the first termination node for handling the traffic. For instance, the routing decision engine 106 may determine that the termination node 110(2) is more optimal than the termination node 110(1) for handling the traffic associated with the resource 108 prior to any resource traffic 120 being sent to the resource 108.

At operation 606, the method 600 includes causing a redirect of the traffic so that the client device sends the traffic through a second encrypted tunnel to the second termination node. For instance, the routing decision engine 106 may cause the redirect 116 of the traffic so that the client device 102 sends the tunneled traffic 118 and/or the resource traffic 120 through the termination node 110(2).

Figure 7:
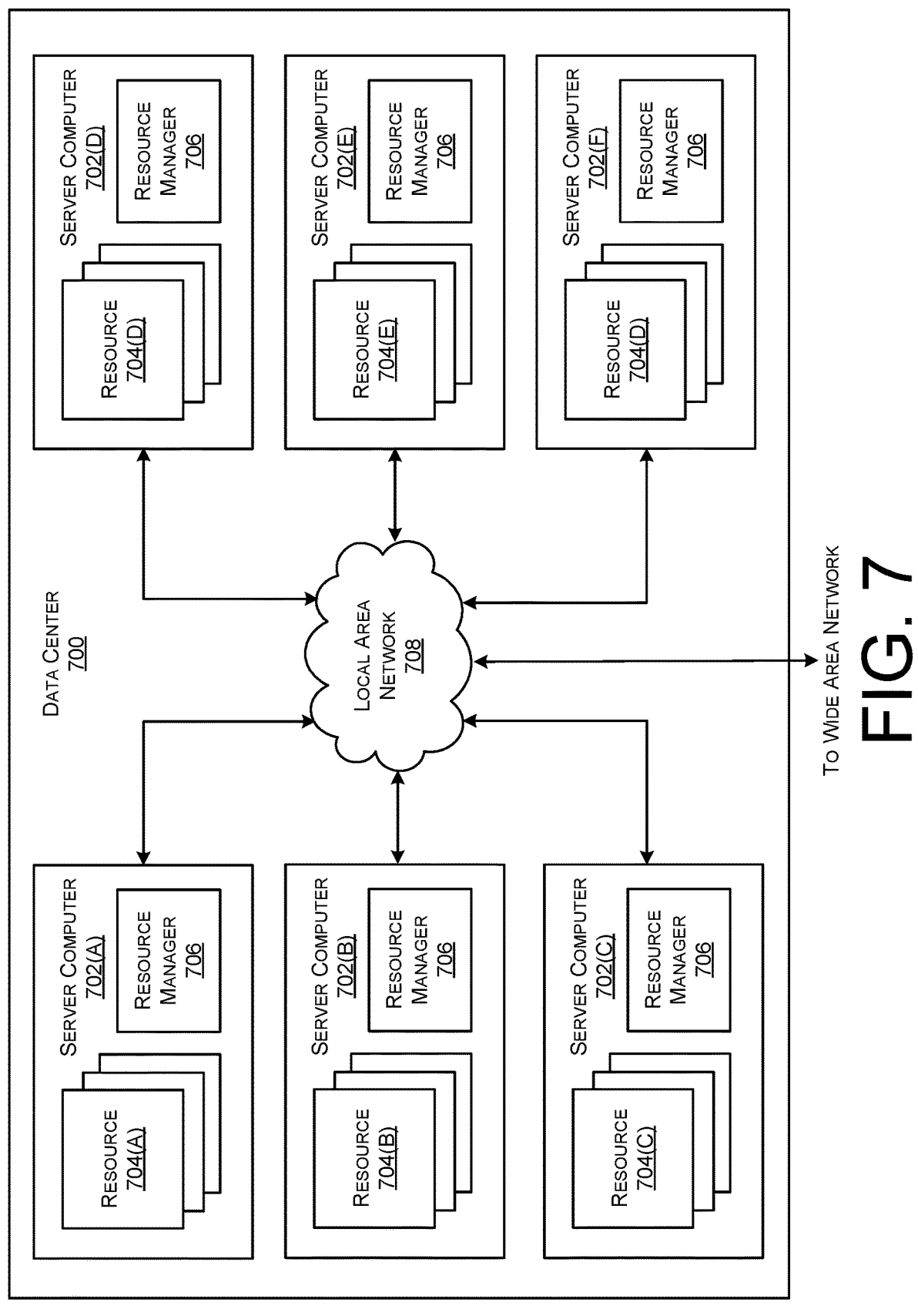
FIG. 7 is a computing system diagram illustrating an example configuration of a data center that can be utilized to implement aspects of the technologies disclosed herein.

FIG. 7 is a computing system diagram illustrating an example configuration of a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, any type of networked devices or nodes described herein. Although described as servers, the server computers 702 may comprise any type of networked device, such as servers, switches, routers, hubs, bridges, gateways, modems, repeaters, access points, etc. In some examples, the example data center 700 may correspond with the data centers 104 described herein.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, security, packet inspection, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate local area network (LAN) 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein. In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like. The computing resources 704 may be utilized to run instances of secure access nodes or other workloads.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, secure access points, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations.

Figure 8:
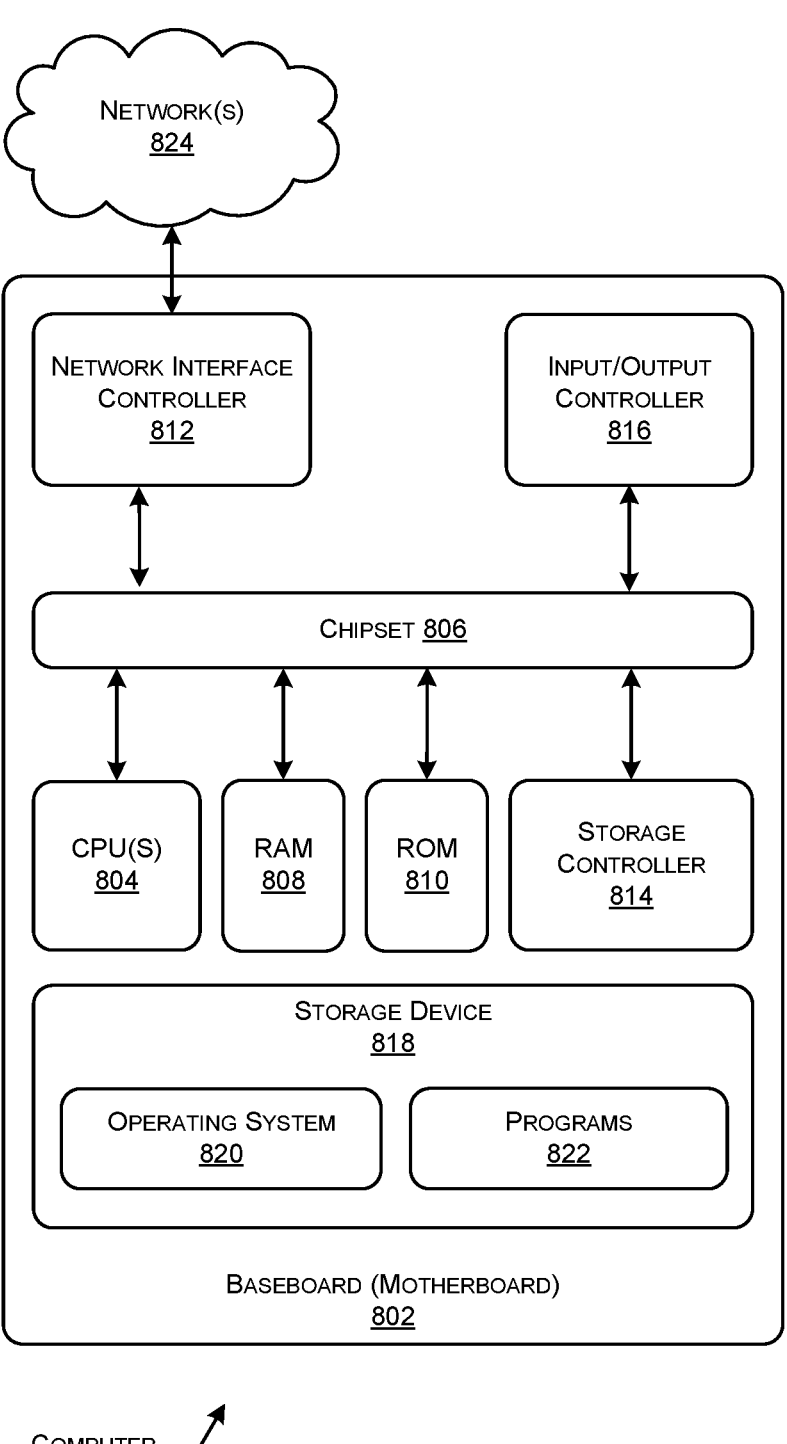
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein. The computer architecture shown in FIG. 8 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network. The chipset 806 can include functionality for providing network connectivity through a NIC 812, such as a gigabit Ethernet adapter. The NIC 812 is capable of connecting the computer 800 to other computing devices over the network 824. It should be appreciated that multiple NICs 812 can be present in the computer 800, connecting the computer to other types of networks and remote computer systems. In some examples, the NIC 812 may be configured to perform at least some of the techniques described herein.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the architecture 100 and or any components included therein, may be supported by one or more devices similar to computer 800. Stated otherwise, some or all of the operations performed by the architecture 100, and or any components included therein, may be performed by one or more computer devices 800 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes and functionality described above with regard to FIGS. 1-7, and herein. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

The computer 800 may include one or more hardware processors (processors) configured to execute one or more stored instructions. The processor(s) may comprise one or more cores. Further, the computer 800 may include one or more network interfaces configured to provide communications between the computer 800 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for utilizing intelligent routing and redirection techniques to deliver an optimal secure access experience for a resource over a tunneled or proxied connection.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:

determining that a first termination node associated with a first encrypted tunnel has received, via the first encrypted tunnel, a request for a resource from a client device such that a second termination node did not receive the request, wherein the first termination node receives the request for the resource instead of the second termination node based at least in part on a proximity of the first termination node to the client device and the first termination node being more optimal for handling tunneled traffic being sent through the first encrypted tunnel;

prior to resource traffic being sent to or received from the resource, determining that the second termination node that did not receive the request is more optimal than the first termination node for handling the resource traffic based at least in part on traffic constraints of the second termination node instead of the proximity of the first termination node to the client device; and based at least in part on determining that the second termination node is more optimal, causing a redirect of the tunneled traffic and the resource traffic so that the client device sends the tunneled traffic through a second encrypted tunnel to the second termination node and the resource traffic from the second termination node to the resource.

2. The method of claim 1, wherein:

the tunneled traffic is encapsulated traffic when it is being sent through the second encrypted tunnel and the resource traffic is unencapsulated traffic when it is being sent between the second termination node and the resource, and determining that the second termination node is more optimal than the first termination node for handling the unencapsulated traffic comprises determining that a routing path between the client device and the resource that traversed the second encrypted tunnel and the second termination node is an optimal routing path for both the encapsulated traffic and the unencapsulated traffic.

3. The method of claim 1, wherein the first termination node is located in a first datacenter disposed in a first geographic location and the second termination node is located in a second datacenter disposed in a second geographic location, the second geographic location closer to the resource than the first geographic location.

4. The method of claim 1, wherein both of the first encrypted tunnel and the second encrypted tunnel are at least one of virtual private network (VPN) connections, zero trust network (ZTN) connections, proxy connections, or proxy and relay connections.

5. The method of claim 1, further comprising causing the second encrypted tunnel to be established between the client device and the second termination node prior to causing the redirect of the tunneled traffic and the resource traffic.

6. The method of claim 1, wherein:

the first termination node is a first proxy node and the first encrypted tunnel includes a first relay node disposed between the client device and the first proxy node, and the second termination node is a second proxy node and the second encrypted tunnel includes a second relay node disposed between the client device and the second proxy node.

7. The method of claim 6, wherein:

the first relay node and the first proxy node are associated with a first datacenter, the second relay node and the second proxy node are associated with a second datacenter, and the first datacenter and the second datacenter are disposed in different geographic locations.

8. The method of claim 6, wherein:

the first relay node and the first proxy node are associated with a first datacenter, the second relay node is associated with a second datacenter, the second proxy node is associated with a third datacenter, and the first datacenter, the second datacenter, and the third datacenter are each disposed in different geographic locations.

9. The method of claim 1, wherein causing the redirect comprises causing a permanent redirect such that the client device stores a mapping indicating that tunneled traffic associated with the resource is to be sent through the second encrypted tunnel.

10. The method of claim 1, wherein causing the redirect comprises causing a temporary redirect, the temporary redirect including a period of time in which the client device is to send the tunneled traffic associated with the resource through the second encrypted tunnel before attempting to send the tunneled traffic through the first encrypted tunnel.

11. A system comprising:

one or more processors; and one or more non-transitory computer-readable media storing instructions that, when executed, cause the one or more processors to perform operations comprising:

determining that a first termination node associated with a first encrypted tunnel has received, via the first encrypted tunnel, a request for a resource from a client device such that a second termination node did not receive the request, wherein the first termination node receives the request for the resource instead of the second termination node based at least in part on a proximity of the first termination node to the client device and the first termination node being more optimal for handling tunneled traffic being send through the first encrypted tunnel;

prior to resource traffic being sent to or received from the resource, determining that the second termination node that did not receive the request is more optimal than the first termination node for handling the resource traffic based at least in part on traffic constraints of the second termination node instead of the proximity of the first termination node to the client device; and based at least in part on determining that the second termination node is more optimal, causing a redirect of the tunneled traffic and the resource traffic so that the client device sends the tunneled traffic through a second encrypted tunnel to the second termination node and the resource traffic from the second termination node to the resource.

12. The system of claim 11, wherein:

the tunneled traffic is encapsulated traffic when it is being sent through the second encrypted tunnel and the resource traffic is unencapsulated traffic when it is being sent between the second termination node and the resource, and determining that the second termination node is more optimal than the first termination node for handling the unencapsulated traffic comprises determining that a routing path between the client device and the resource that traversed the second encrypted tunnel and the second termination node is an optimal routing path for both the encapsulated traffic and the unencapsulated traffic.

13. The system of claim 11, wherein both of the first encrypted tunnel and the second encrypted tunnel are at least one of virtual private network (VPN) connections, zero trust network (ZTN) connections, proxy connections, or proxy and relay connections.

14. The system of claim 11, wherein:

the first termination node is a first proxy node and the first encrypted tunnel includes a first relay node disposed between the client device and the first proxy node, and the second termination node is a second proxy node and the second encrypted tunnel includes a second relay node disposed between the client device and the second proxy node.

15. The system of claim 14, wherein:

the first relay node and the first proxy node are associated with a first datacenter,

the second relay node is associated with a second data-center, the second proxy node is associated with at least one of the second datacenter or a third datacenter, and the first datacenter, the second datacenter, and the third datacenter are each disposed in different geographic locations.

16. One or more non-transitory computer-readable media storing instructions that, when executed, cause one or more processors to perform operations comprising:

determining that a first termination node associated with a first encrypted tunnel has received, via the first encrypted tunnel, a request for a resource from a client device such that a second termination node did not receive the request, wherein the first termination node receives the request for the resource instead of the second termination node based at least in part on a proximity of the first termination node to the client device and the first termination node being more optimal for handling tunneled traffic being sent through the first encrypted tunnel;

prior to resource traffic being sent to or received from the resource, determining that the second termination node that did not receive the request is more optimal than the first termination node for handling the resource traffic based at least in part on traffic constraints of the second termination node instead of the proximity of the first termination node to the client device; and based at least in part on determining that the second termination node is more optimal, causing a redirect of the tunneled traffic and the resource traffic so that the client device sends the tunneled traffic through a second encrypted tunnel to the second termination node and the resource traffic from the second termination node to the resource.

17. The one or more non-transitory computer-readable media of claim 16, wherein:

the tunneled traffic is encapsulated traffic when it is being sent through the second encrypted tunnel and the resource traffic is unencapsulated traffic when it is being sent between the second termination node and the resource, and determining that the second termination node is more optimal than the first termination node for handling the unencapsulated traffic comprises determining that a routing path between the client device and the resource that traversed the second encrypted tunnel and the second termination node is an optimal routing path for both the encapsulated traffic and the unencapsulated traffic.

18. The one or more non-transitory computer-readable media of claim 16, wherein both of the first encrypted tunnel and the second encrypted tunnel are at least one of virtual private network (VPN) connections, zero trust network (ZTN) connections, proxy connections, or proxy and relay connections.

19. The method of claim 1, wherein the request is a first request, the tunneled traffic is first tunneled traffic, and the resource traffic is first resource traffic, the method further comprising:

determining that the first termination node associated with the first encrypted tunnel has received, via the first encrypted tunnel, a second request for the resource from the client device such that a second termination node did not receive the request based at least in part on the first termination node being more optimal for handling second tunneled traffic being sent through the first encrypted tunnel;

determining that the second termination node that did not receive the request is less optimal than the first termination node for handling the second tunneled traffic;

determining that the second termination node that did not receive the request is less optimal than the first termination node for handling second resource traffic;

prior to the second resource traffic being sent to or receive from the resource, determining that the second termination node that did not receive the request is more optimal than the first termination node for handling a combination of the second tunneled traffic and the second resource traffic; and based at least in part on determining that the second termination node is more optimal, causing a redirect of the second tunneled traffic and the second resource traffic.

20. The system of claim 11, wherein the first termination node is more optimal for handling tunneled traffic being sent through the first encrypted tunnel, the operations further comprising:

determining that the first termination node associated with the first encrypted tunnel has received, via the first encrypted tunnel, a second request for the resource from the client device such that a second termination node did not receive the request based at least in part on the first termination node being more optimal for handling second tunneled traffic being sent through the first encrypted tunnel;

determining that the second termination node that did not receive the request is less optimal than the first termination node for handling the second tunneled traffic;

determining that the second termination node that did not receive the request is less optimal than the first termination node for handling second resource traffic;

prior to the second resource traffic being sent to or receive from the resource, determining that the second termination node that did not receive the request is more optimal than the first termination node for handling a combination of the second tunneled traffic and the second resource traffic; and based at least in part on determining that the second termination node is more optimal, causing a redirect of the second tunneled traffic and the second resource traffic.

* * * * *